US006527821B2

(12) United States Patent
Liu et al.

(10) Patent No.: US 6,527,821 B2
(45) Date of Patent: Mar. 4, 2003

(54) AUTOMATIC CONDENSED OIL REMOVER

(75) Inventors: Benjamin Y. H. Liu, North Oaks, MN (US); James J. Sun, New Brighton, MN (US)

(73) Assignee: MSP Corporation, Shoreview, MN (US)

( * ) Notice: Subject to any disclaimer, the term of this patent is extended or adjusted under 35 U.S.C. 154(b) by 0 days.

(21) Appl. No.: 10/086,328

(22) Filed: Feb. 28, 2002

(65) Prior Publication Data

US 2002/0092424 A1 Jul. 18, 2002

Related U.S. Application Data

(62) Division of application No. 09/829,386, filed on Apr. 9, 2001, now Pat. No. 6,364,941, which is a division of application No. 09/199,894, filed on Nov. 25, 1998, now Pat. No. 6,221,136.

(51) Int. Cl.$^7$ .................... B01D 46/42

(52) U.S. Cl. .................... 55/385.3; 55/DIG. 19; 60/275; 60/599; 96/405; 123/41.86; 123/198 DA; 123/563; 165/51

(58) Field of Search .................... 55/385.3, DIG. 19; 96/60, 62, 64–66, 88, 96, 405; 60/275, 311, 599; 123/198 E, 198 DA, 563, 41.86; 165/51; 95/288, 67, 73

(56) References Cited

U.S. PATENT DOCUMENTS

| | | | | | |
|---|---|---|---|---|---|
| 342,548 | A | | 5/1886 | Walker | 95/57 |
| 895,729 | A | | 8/1908 | Cottrell | 95/73 |
| 1,204,907 | A | | 11/1916 | Schmidt | 96/96 |
| 1,250,088 | A | | 12/1917 | Burns | 95/75 |
| 1,329,285 | A | | 1/1920 | Brownlee | 285/131.1 |
| 1,605,648 | A | | 11/1926 | Cooke | 96/66 |
| 1,994,259 | A | | 3/1935 | Thorne | 96/88 |
| 2,085,349 | A | | 6/1937 | Wintermute | 96/65 |
| 2,129,783 | A | | 9/1938 | Penney | 96/79 |
| 2,142,129 | A | | 1/1939 | Hoss et al. | 96/66 |
| 2,509,548 | A | | 5/1950 | White | 96/82 |
| 2,731,958 | A | * | 1/1956 | Robley | 55/DIG. 19 |
| 3,246,639 | A | * | 4/1966 | Oliver | 55/DIG. 19 |
| 3,509,967 | A | * | 5/1970 | Ballard | 123/41.86 X |
| 3,754,538 | A | * | 8/1973 | Ephraim, Jr. et al. | 123/41.86 |
| 3,910,779 | A | | 10/1975 | Penney | 96/66 |
| 3,977,384 | A | * | 8/1976 | Jahn | 123/198 DA X |
| 3,999,964 | A | | 12/1976 | Carr | 96/59 |
| 4,029,482 | A | | 6/1977 | Postma et al. | 96/66 |
| 4,222,748 | A | | 9/1980 | Argo et al. | 96/66 |
| 4,563,983 | A | * | 1/1986 | Hayashi et al. | 60/599 X |
| 4,578,088 | A | | 3/1986 | Linscheid | 96/88 |
| 4,708,095 | A | * | 11/1987 | Luterek | 123/563 X |
| 4,890,455 | A | | 1/1990 | Leonhard et al. | 60/275 |
| 5,006,134 | A | | 4/1991 | Knoll et al. | 96/88 |
| 5,024,685 | A | | 6/1991 | Torok et al. | 96/96 |
| 5,239,972 | A | * | 8/1993 | Takeyama et al. | 123/41.86 |
| 5,547,019 | A | * | 8/1996 | Iacullo | 165/51 |
| 5,942,026 | A | * | 8/1999 | Erlichman et al. | 55/385.3 X |
| 6,047,670 | A | * | 4/2000 | Stella et al. | 123/41.86 |
| 6,055,966 | A | * | 5/2000 | Zentgraf | 123/198 E X |
| 6,109,346 | A | * | 8/2000 | Hill | 165/51 X |
| 6,123,144 | A | * | 9/2000 | Morman et al. | 165/51 X |
| 6,221,136 | B1 | * | 4/2001 | Liu et al. | 96/66 |
| 6,364,941 | B2 | * | 4/2002 | Liu et al. | 96/60 |

FOREIGN PATENT DOCUMENTS

| | | | |
|---|---|---|---|
| DE | 3702469 | 8/1988 | 96/88 |
| DE | 39 30 872 A | 3/1991 | |
| EP | 0 044 361 A | 1/1982 | |
| EP | 307656 | 3/1989 | 96/88 |

* cited by examiner

*Primary Examiner*—Richard L. Chiesa
(74) *Attorney, Agent, or Firm*—Westman, Champlin & Kelly P.A.

(57) ABSTRACT

An automatic condensed oil remover for an intercooler of a diesel engine has a flow restrictor that is positioned between the intercooler and the diesel engine, an oil sump in the intercooler, and an oil tube carrying condensed oil from the oil sump to the diesel engine. The flow restrictor creates a pressure drop sufficient to force the oil to flow from the oil sump through the oil tube to the diesel engine.

3 Claims, 13 Drawing Sheets

AUTOMATIC CONDENSED OIL REMOVER

This is a Divisional Application of copending Application Ser. No. 09/829,386, filed Apr. 9, 2001, now U.S. Pat. No. 6,364,941 which a is Divisional Application of Application Ser. No. 09/199,894, filed Nov. 25, 1998, for COMPACT ELECTROSTATIC PRECIPITATOR FOR DROPLET AEOROSOL COLLETION, now U.S. Pat. No. 6,221, 136, and priority on both Applications Ser. No. 09/829,386 and Ser. No. 09/199,894 is hereby claimed.

BACKGROUND OF THE INVENTION

This invention relates to droplet aerosol collection by electrostatic precipitation, and methods that improve efficiency for particle collection. The improvements include one or more of the use of multiple, thin wire discharge electrodes; the use of a conductive porous medium as a collecting surface; the use of high voltage electrostatic shield to prevent particle deposition on the insulator for the components; and the use of heated insulator to prevent vapor condensation and particle deposition by thermophoresis.

Electrostatic precipitation is one of the most widely used methods for removing suspended particulate matter from a gas for gas cleaning or air pollution control. In comparison with other particulate collecting devices, such as cyclones, wet scrubbers, filters, and the like, an electrostatic precipitator has the advantage of low pressure drop, high collection efficiency and requiring relatively small amounts of electrical power for its operation. The low pressure drop 6f the electrostatic precipitator makes the device most advantageous with large volumetric flow rates of the gas flow needing treatment. Electrostatic precipitation have been used extensively for large scale industrial applications, such as removing fly ash from power plants, controlling particulate emission from smelters, steel and cement making and other similar industries, and general purpose air cleaning for building ventilation. A typical electrostatic precipitator may operate at several hundred cubic feet per minute of flow in small systems, to several million cubic feet per minute for large industrial installations.

The first laboratory demonstration of electrostatic precipitation was made by Hohifeld in 1824, according to credible sources. The first U.S. patent on electrostatic precipitation was issued to Walker in 1886 as U.S. Pat. No. 342,548. Numerous other electrostatic precipitator patents have been issued over the years. Those considered the most significant include U.S. Pat. No. 895,729 to Cottrell on the use of rectified alternating current for electrostatic precipitation, and the invention of the liquid film precipitator by Bums as shown in patent U.S. Pat. No. 1,298,088; the fine wire electrode and two-stage precipitation system of Schmidt, U.S. Pat. No. 1,329,285; the low-ozone air-cleaning precipitator of Penney U.S. Pat. No. 2,000,654; and pulse energizing of precipitators disclosed in U.S. Pat. No. 2,509,548 to White, among others.

The fundamental design of the electrostatic precipitator has remained relatively unchanged over the years. In its simplest form for a single stage precipitator, a high voltage electrode is placed in the center of a grounded tube. A high DC voltage on the small diameter center electrode causes a corona discharge to develop between the electrode and the interior surface of the tube. As the gas containing suspended particles flows between the electrode and the wall of the tube, the particles are electrically charged by the corona ions. The charged particles are then precipitated electrostatically by the electric field onto the interior surface of the collecting tube.

One disadvantage of the electrostatic precipitator is its relatively large physical size. According to Deutsch (W. Deutsch, Ann. der Physik, Volume 68, p. 335, 1922), the basic equation governing the operation of the electrostatic precipitator is:

$$\eta=1-e^{-A\ w/Q}$$

The Deutsch equation relates the precipitator collection efficiency, η, to the collecting area of the precipitator, A, the volumetric flow rate, Q, through the precipitator, and the electrical migration velocity, w, of the particles is the constant, 2.718, the base of natural logarithms. For a specific application, the collecting area of the precipitator, A, is determined when the required volumetric gas flow rate, Q, is known. To reduce the overall physical size of the precipitator, closely spaced precipitating plates can be used. However, there is a limit on this approach to reducing physical size. When the resulting physical size of the precipitator is still too large for the application, an electrostatic precipitator is then considered unfeasible.

Several applications have developed in recent years where a significant reduction in the overall physical size of the electrostatic precipitator is needed. One application is the removal of the suspended particulate matter from the blowby gas from a Diesel engine. In Diesel engines, the high temperature, high pressure combustion gas in the engine cylinder has a tendency to leak past the piston rings into the crankcase. This is usually referred to as the blowby gas. This blowby gas contains lubricating oil droplets from the lubricating oil films atomized by the highs velocity blowby gas flowing from the high pressure cylinder into the crankcase. It also contains Diesel exhaust particulates, which result from the incomplete combustion of the Diesel fuel in the engine cylinder. The amount of blowby gas is relatively small for new engines, but will increase over time as the engines age, and the piston rings no longer provides a good seal. This blowby gas usually has a flow rate of few cubic feet per minute to perhaps as high as 20 cfm for engines in good operating condition.

The Diesel blowby gas is currently being exhausted directly into the atmosphere. In order to protect the environment, there is a need to remove suspended oil droplets and Diesel exhaust particulates in the blowby gas so that the blowby gas can be returned to the fresh air intake side of the Diesel engine for further combustion. This "blowby gas recirculation system" is practical only when the suspended particulate matter is removed to avoid contaminating the components and equipment located on the air intake side of the Diesel engine. One such component is the turbo charger or compressor used to supercharge the Diesel engine to increase its power output and efficiency.

For application in the blowby gas recirculation system, the electrostatic precipitator must be compact and reliable. It is also desirable that the operating voltage of the precipitator be relatively low so that very a high supply voltage is not needed.

Another application for an electrostatic precipitator that is reduced in size from existing precipitators is for removing suspended oil and grease particles in the exhaust gas from commercial kitchens, including kitchens in fast-food, as well as conventional, restaurants.

A third application of an electrostatic precipitator of reduced size is to remove cutting fluid droplets from the machine shop environment. During machining of metal parts, a cutting fluid is usually directed at the tool and the parts being machined to provide cooling as well as lubrication. Some of this cutting fluid is aerosolized to form small droplets by the higher speed rotary cutting tool. This cutting fluid aerosol presents a heath hazard to the workers and must be filtered to remove the suspended droplets. Conventional fibrous filters are not suitable for this application, because the collected droplets tend to clog the filter and produce excessive pressure drop in a short time. The inherent advantage of the small compact physical size and the inherent flame arresting properties of the precipitator of the present invention makes it particularly suited for these applications.

It should be noted the term "compact size" is used here in a relative sense to indicate that the size of the precipitator designed on the basis of this invention is smaller or more compact in comparison with electrostatic precipitators of a conventional design at the same flow rate and at the same efficiency level. By necessity, as a diesel blowby particle collector, the electrostatic precipitator must be sufficiently small to fit under the hood of a truck powered by a diesel engine. The overall volume of the collector must be no more than a few liters, preferably below two liters. On the other hand, an electrostatic precipitator designed for kitchen exhaust applications will need to be considerably larger because of the high flow rate of the exhaust gas to be treated. Such a collector can also be called compact even though the collector is several cubic feet in total volume so long as the collector of the conventional design is even larger, perhaps by as much as 50 or 100%.

SUMMARY OF THE INVENTION

The present invention is an electrostatic precipitator that has improved operating efficiency while being smaller in physical size than existing devices that handle similar flow rates. The present device uses multiple electrical wire discharge electrodes which permit reducing the length of the precipitator. An electrically conductive porous medium is preferably used as the collecting surface. A further aspect of the invention is an electrostatic shield used to reduce or prevent particle deposition on the insulators for high voltage components. A further aspect of the invention is use of heated electrodes which prevent vapor condensation and also prevent particle deposition by thermophoresis.

All aspects of the invention cooperate to increase efficiency and reduce physical size for a given flow rate. These improvements have made it possible to significantly reduce the overall physical size of the precipitator. The small, compact physical size has in turn made it practical to use electrostatic particle collection for the above applications where small physical size is important. Treating diesel blowby exhaust to remove suspended oil droplets and particulate matter permits the blowby exhaust gas to be discharged to the ambient with minimal amount of particulate air pollutant, or to be returned to the air intake side of the diesel engine for exhaust gas recirculation. When used to remove oil and grease particles contained in the exhaust of commercial kitchens the organic particulate matter will be removed. Another application is collecting droplet aerosols of cutting-fluid in machine shops where sprayed liquids enter the atmosphere.

While the present invention was primarily developed for applications such as those described above, the small compact size of the new precipitator makes the device suitable for a variety of other applications, even in those cases where small physical dimensions are not a primary requirement.

For the purpose of this disclosure, Aerosol is defined as small particles suspended in a gas. The particles can be a solid, a liquid, or a mixture of both. The particle size can range from approximately 0.001 $\mu$m to 100 $\mu$m, with 0.01 $\mu$m to 20 $\mu$m being the size range of the greatest interest. For the present application, most of the mass of aerosol particles to be collected is concentrated in the latter size range. Droplet aerosol is defined as an aerosol in which the suspended particles are primarily in a droplet form and having a spherical shape. However, the liquid droplets need not be a pure liquid, and may contain suspended solid particles within each droplet.

DETAILED DESCRIPTION OF THE PREFERRED EMBODIMENTS

Figure 1:
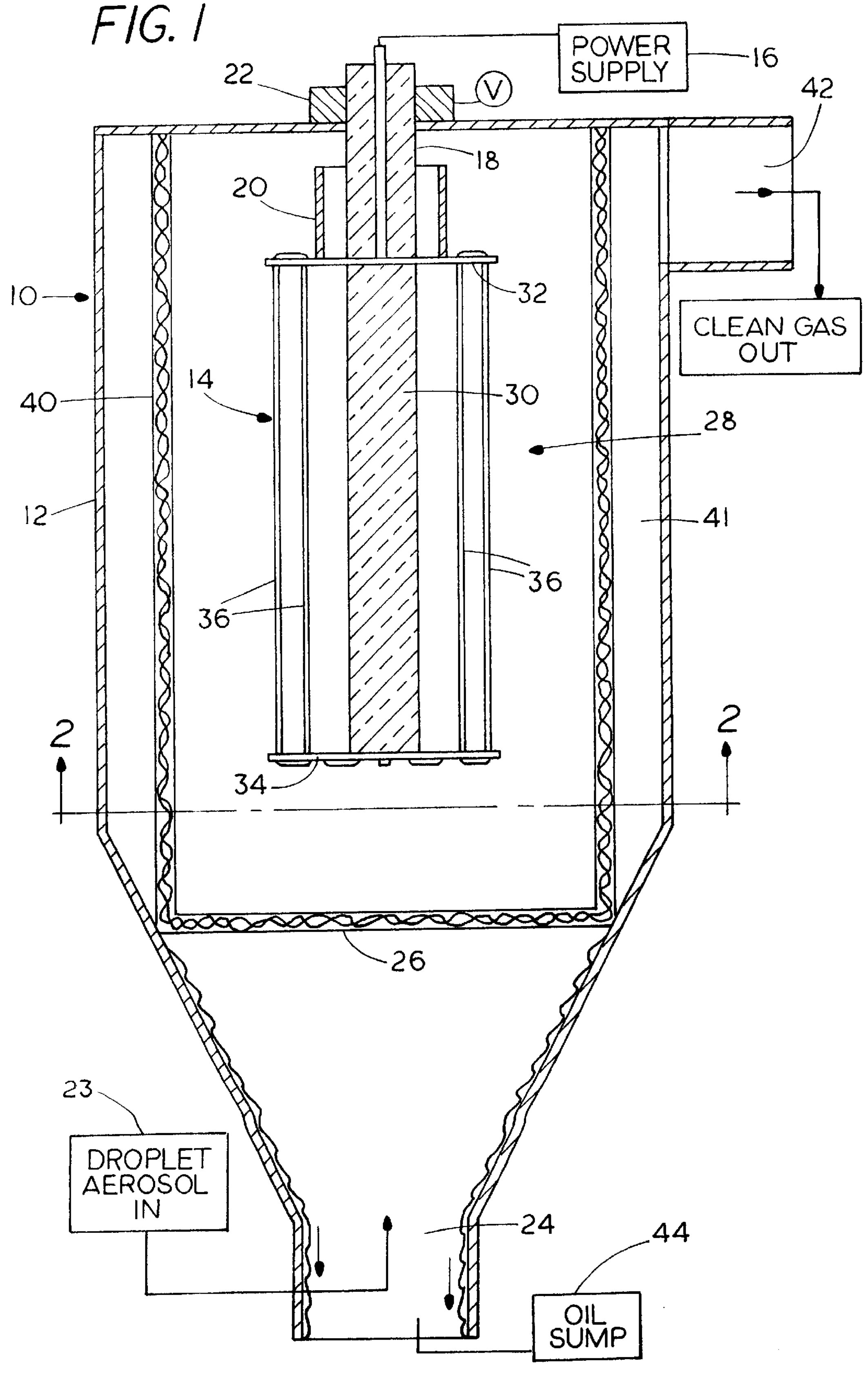
FIG. 1 is a schematic cross sectional view of a compact electrostatic precipitator made according to the.,present invention.

FIG. 1 is a schematic cross sectional view of an electrostatic precipitator 10 made according to the present invention. A housing 12 has a discharging electrode assembly 14 to produce the corona discharge. The high voltage DC power supply 16 applies a high voltage (several thousand volts), to the electrode assembly 14 on a wire surrounded by an insulator bushing 18. The bushing 18 is surrounded by a high voltage shield 20, made of suitable conducting material.

An electric heater 22 is in contact with the insulator bushing 18 to keep the insulator bushing at a sufficiently high temperature to prevent vapor condensation and particle deposition on the bushing 18.

Gas containing suspended droplets and other particulate matter from a source 23 is directed to flow through an inlet opening 24 of the housing 12 and passes through a porous medium 26 in the inlet. The porous medium 26 is a relatively inefficient droplet collector to keep out large contaminants, so that most of the droplets in the aerosol are carried by the gas into the electrostatic electrode region or chamber 28 above.

Figure 2:
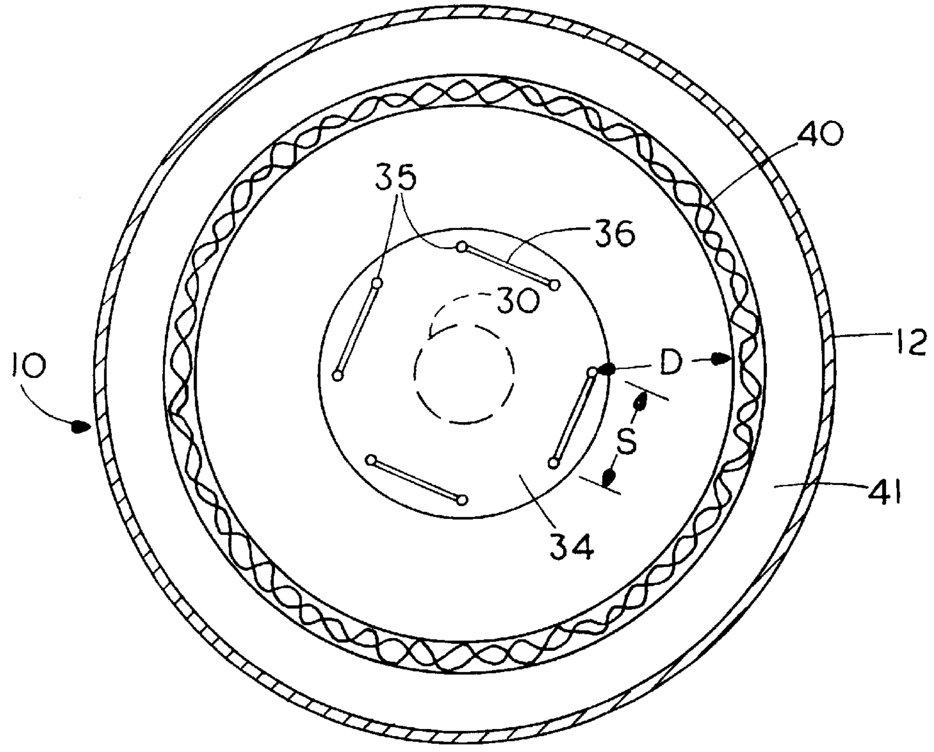
FIG. 2 is a sectional view taken on horizontal line 2—2 in FIG. 1.

The input gas then flows around the electrode assembly 14 to expose the droplet particles in the gas to the high electric field around the electrode assembly. The discharge electrode assembly 14 includes a central rigid support 30 for two support discs 32 and 34 on opposite ends of the central support. The upper disc 32 may be attached to the insulator bushing 18 and thus support the discs 32 and 24 from the housing 12. A plurality of holes 35 (see FIG. 2) are formed in each disc 32 and 34 and a fine metal wire, 36 is strung between them. The sectional view FIG. 2, through the compact electrostatic precipitator electrode 14 shows there are eight holes in each of the support discs. A fine metal wire 36 is threaded through the holes to form eight straight, parallel discharge electrodes 36. By way of example, if the distance between the two support discs is 8 inches, the fine wire electrode 36 extending between them will each be 8 inches in length for a total discharge electrode length of 64 inches. More holes can be used in the support discs 32 and 34 to create more discharge electrodes, or fewer holes can be used if less length of the discharge electrodes is needed. With the above mentioned distance of 8 inches between the support disks, an electrode circle diameter of 3 inches, the diameter of the housing 12 is approximately 5 inches, and its length, approximately 10 inches. Using the conventional design of a single discharge electrode in the center of a tube, the total length of the electrostatic precipitator is more than 64 inches. The advantage of the present electrode design in reducing the size of the precipitator and making it compact over the conventional design thus becomes obvious.

The gas (aerosol) flows around the wires 36 and ions are produced in the corona discharge. The ions collide with the droplets to cause the droplets to be charged. The charged droplets are then carried by the gas flow through an electrically conducting, grounded porous medium 40 as the gas flows to an outlet 42. The droplets are collected by electrostatic precipitation onto the grounded collecting elements in the medium.

The clean gas then flows out of the annular space 41 between the porous medium 40 and the outer housing 12 to the outlet 42. The collected oil droplets flow down the inside surface of the porous medium 40 as a thin film which is returned by gravity to an oil reservoir or sump 44.

As shown in FIG. 1, all parts of the system are grounded except for the high voltage electrode assembly and the high voltage shield 20.

Using a thin wire of a uniform diameter in the above electrode arrangement, and in other embodiments disclosed, it is important to keep the distance between each wire segment and the adjacent collector electrode the same for all the wire segments on the support structure. By keeping the distance uniform and using the same high voltage potential on all the wire segments, a uniform corona discharge can be maintained. This will insure that all particles flowing through the device will be charged uniformly and to the same maximum possible extent to insure high collection efficiency for the device.

In designing an electrostatic precipitator using the above electrode assembly, the spacing, S, between the wire segments must bear a proper relationship to the distance, D, between the wire segment and the adjacent collector electrode surface. (see FIG. 2). Too small a spacing, S, will cause the closely spaced wire segments to interfere with each other, thereby reducing the maximum current that can be obtained from each wire. Too large a spacing will cause some empty spots on the collector electrode surface to appear. Within these empty spots, there are no corona current flow. Particles flowing over these empty spots will not encounter corona ions and thus remain uncharged. From experience, it has been found that the ratio, S/D, must be kept between the limits of 0.1 and 10, preferably between 0.3 and 3, for the electrode assembly to function properly and avoid-degradation in performance.

For application in a Diesel blowby gas recirculation system, the inlet housing 24 is connected to an opening in the crankcase, which is represented at 23, and the collected oil film is also returned directly to the crankcase. The outlet 42 can be open to the atmosphere to allow the cleaned blowby gas to be discharged to the atmosphere, or the outlet 42 can be connected to the intake of the Diesel engine for exhaust gas recirculation.

The total discharge electrode length is greatly increased from that of the conventional precipitator with a single discharge electrode in the center of a tube. The corona current that can be maintained between the discharge electrode and the collecting tube is generally proportional to the total electrode length. The approach described here makes it possible to greatly increase the electrode length and hence the total corona current, thereby increasing the efficiency for both droplet particle charging and precipitation of the charged droplets or particles. A laboratory prototype device has demonstrated the practicality of this approach. As many as sixteen discharge electrodes have been used leading to approximately a factor of sixteen increase in total corona current in laboratory prototypes.

Another purpose of the electrode design shown is to allow the discharge electrode to be circumferentially supported on a circle. A large diameter circle of the electrode length mounting will bring the discharge electrodes (the wires) closer to the porous medium 40 collecting surface, thereby reducing the voltage needed to maintain the corona discharge between the electrode and the grounded porous collecting surface. A lower operating voltage from existing precipitators is desirable for the applications described above, to reduce the need for very high voltage insulation. When using a lower voltage, the leakage current through the insulator bushing 18 can be reduced. Using a lower voltage also reduces the cost and complexity of the power supply 16, thus making the device more economical to produce. In the present device, voltages of between 5,000 to 10,000 volts are most preferred, but voltages up to 20,000, volts DC can be used.

Using a circle of electrode lengths spaced from the center rod also forces the gas flowing radially outward toward the porous collecting surface to be exposed to the very high electric field surrounding each discharge electrode. Generally, the electric field strength according to Gauss's law tends to decrease with increasing distance from the discharge electrode. The closely spaced wires forming the discharge electrodes forces the gas to pass through the high field region between the electrodes and to be exposed to the high electric field around the wires. Each droplet or particle can thus be charged to a higher level than is possible with the conventional single length electrode design, thereby gaining a higher electrical charge and allowing droplets to be more easily removed by electrostatic precipitation.

Although a porous collector electrode 40 is shown in FIG. 1 as the collector electrode, the basic design of the discharge electrode assembly 14 works well also when the collector electrode is made of a solid conducting material, in which case the housing 12 itself can be the collector. The oil droplets will be collected on the interior surface of the housing walls. The collected oil droplets will then flow down the walls and be returned to the oil sump or the crankcase of the diesel engine, eliminating the porous collector electrode will make the device less efficient, but the overall size, the complexity, and the cost of the device will also be reduced.

The high-voltage insulator bushing 18, if unprotected, will be exposed to the suspended droplets or particles in the gas, as well as any condensable vapor which may be present. Over time, the accumulation of deposited and condensed material on the insulator will render it ineffective. The insulator is heated by contact with the electrical heating element 22 to a high enough temperature to prevent vapor condensation on the insulator bushing.

To prevent the precipitation of droplets or particles on the insulator bushing surface, a conductive shroud or shield 20 surrounds the insulator. This conductive shroud 20 is connected to the same high voltage source as the discharge electrodes 36 so that a high electric field is created in the region between the shroud and the nearby grounded surfaces of the porous medium 40 or housing 12. The charged droplets or particles present in the gas will thus be precipitated onto the grounded surfaces and not on the high voltage insulation bushing.

Figure 3A:
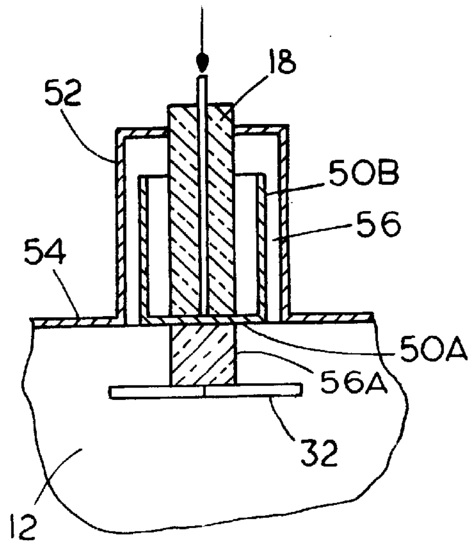
FIG. 3A is a schematic sectional view of a modified form of the electrode support and high voltage shield used with the precipitator of FIG. 1.
Figure 3B:
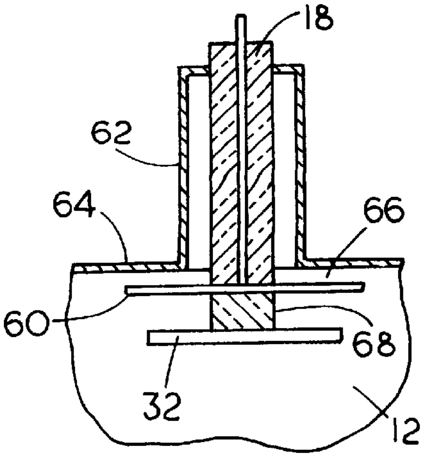
FIG. 3B is a further modified form of a electrode support and high voltage shield used with the precipitator of FIG. 1.

Design variations of conductive shroud 20 are shown in FIGS. 3A and 3B. By using a small gap spacing between the bottom plate of the shield or shroud and the nearby grounded surface, a high electric field can be created in this gap space to also precipitate droplets or particles in the gas.

In FIG. 3A, the modified high voltage shield as indicated at 50, and as shown has a base plate 50A, and the surrounding wall 50B that surrounds the insulator bushing 18. The grounded housing 12 has a cap portion 52 that comes up from a top wall 54 and defines an opening near the upper end of the insulator 18, as shown. The surrounding wall 50B is spaced from the wall over cap 52, and terminates short of the upper end wall of the cap. Thus there is a gap shown at 56 between the shield wall 50B and the housing wall 52 around the insulator. The support shown at 56 supports a top plate 32 of the electrode assembly. The central support and the lower electrode plate 34 can be provided as before.

In FIG. 3B, the high voltage shield comprises a flat disc 60 that is fixed to the lower end of the insulator bushing 18, and the insulator bushing 18 in this case is also surrounded by a sleeve or cap 62 of the housing, which is grounded.

The top wall 64 of the housing is spaced from the plate 60, to form a gap 66 between the housing wall 64, which is a top wall, and the plate 60 which is a shielding disc. The support 68 can be used for supporting a top plate 32 of the electrode assembly as before.

Each of these forms of conductive shroud shows a gap between the high voltage shield or shroud and a portion of the grounded housing. The gap is relatively narrow, and will provide for precipitation of charged particles that come near the high voltage shield, to the walls of the grounded housing.

Creating a long pathway in the gap space as shown in FIG. 3A and 3B, the charged droplets or particles in the gas can be efficiency precipitated in the regions surrounding the insulator bushing 18 to provide improved protection of the high voltage insulator from particulate contamination.

In spite of the efficient high voltage insulator shield design of this invention, there is the possibility that some droplets or particles in the gas may remain uncharged. These uncharged particles, will be capable of penetrating through the gap space 56 or 66 between the shroud and the nearby grounded surface to deposit on the insulator. The precipitation of these uncharged particles on the insulator can be prevented by utilizing the phenomena of thermophoresis.

Thermophoresis refers to the movement of aerosol particles in the direction of a decreasing temperature gradient due to the radiometric force acting on the particles. For effective thermophoretic motion of the particles to prevent particle precipitation on the insulator the insulator must he held at a sufficiently high temperature. The insulator temperature must be 10° C. or more than the surrounding gas temperature. In contrast, to prevent vapor condensation, the insulator only needs to be held above the dew point of the condensable species in the gas. Usually at least a few degree C above the gas temperature would be sufficient To be effective, the porous medium 40 must be made of a conductive material, usually metal. It can be made of a perforated metal, a porous, sintered metal, one or more layers of wire mesh material rolled into the desired cylindrical shape, a pad of metal fiber or wires formed into a cylinder, and similar configurations. As the gas flows into the porous medium, particles are brought to close proximity to the surface of the conducting elements in the medium, thus allowing the charged particles to be effectively deposited onto the surface of the conducting elements of the porous medium. In comparison, in the conventional electrostatic precipitator using solid collecting electrodes, such as a solid tube surrounding the center electrodes, the charged particles must be precipitated by electrical force through the fluid boundary layer adjacent to the inner surface of the surrounding tube.

Depending on the gas flow velocity, the relatively stagnant boundary layers adjacent to the solid collecting surfaces may be a centimeter or more in thickness. The particles must be precipitated through this centimeter thick stagnant gas layer to be deposited on the surface. In comparison, using a porous collecting electrode, as shown here, the gas is forced to flow between the closely spaced conducting elements in the porous medium, thereby greatly reducing the distance the particles must travel to reach the collecting surface. This will increase the efficiency of the precipitator and reduce the overall physical size of the device.

Not all electrically conducting porous material can be used with the compact electrostatic precipitator described in this invention. In order to handle the high gas flow rate per unit of collecting surface intended for this application, the porous material must not produce excessive pressure drop at the required high gas flow. In addition, the collected oil drops must drained off easily by gravity and not be collected in the porous medium to clog the medium or produce excessive high pressure drops. Depending on the structure of the porous medium, and the surface tension and viscosity of the liquid droplets being collected, the distance between the conducting elements of the porous medium must be kept above a critical limit. Too small a distance will allow the collected droplets to form surface films bridging neighboring elements and block the flow. For the usual liquid such as lubricating oils, the mean distance between the conductive elements in the medium must be larger than about 5 microns, and preferably larger than 10 μm. The mean distance between the elements in a porous medium is also referred to as the mean pore diameter which can be measured by a commercial poremeter. A mean pore diameter greater than 5 μm, preferably greater than 10 μm, is generally necessary for the medium to work successfully as the porous collecting electrode of the droplet collecting precipitator described herein.

There are a number of devices using a porous medium to collect charged particles. One such device is the electrically augmented bag filter described by Penney in U.S. Pat. No. 3,910,779. In Penney's device, the particles are charged in a corona charger. The charged particles are then carried by the gas flow through a fabric medium and deposited on the surface of the fabric. The particles to be deposited must be a dry solid material, so that the deposited particles on the fabric will form a porous cake. Since a cake will also form on the fabric in the absence of an electrical charge, electrostatics charges are used by Penney to modify the property of this cake namely to increase the pore size of the cake and reduce the pressure drop. The textile fabric used in a fabric filter is usually not electrically conductive, so that it is not possible to maintain a corona discharge directly between the corona electrode and the fabric. A separate corona charger is used upstream of the fabric filter to charge the particles for subsequent filtration by the fabric.

Another device using a porous filter media is what is usually referred to as electrostatically enhanced fibrous filter such as that described by Carr in U.S. Pat. No. 3,999,964. A conventional fibrous filter media made of glass, polymeric and other non-conducting fibers is sandwiched between two sets of electrical grids. A potential difference is established between the grids to create an electric field in the medium to enhance the efficiency of the medium for particle collection by electrostatic attraction. The device is most effective when the particles are electrically charged. If the particles are not charged, a corona ionizer can be used upstream of the filter to charge the particles to increase the efficiency of the filter for particle collection.

A further version of the electrostatically enhanced fibrous filter is that of Argo et al in U.S. Pat. No. 4,222,748. In Argo's device, a corona charger is used upstream to charge the particles. As the charged particles are collected in the fiber bed, which is made of a non-conductive material, charge will build up in the bed to raise its electrical potential. To prevent the continuous buildup of charge in the bed, the bed is continuously irrigated by water to make the bed conductive. Particles collected in the bed are also carried away by the flowing water.

The electrostatic precipitator of the present invention is very efficient and can be made into a small compact size. For many applications, such as diesel blowby filtration, the cylindrical geometry with a circular cross section is the most convenient. However, it is not necessary that the cross section shape be a circle to take advantage of many of the features of this invention. Rectangular, elliptical, and other cross sectional shapes can be easily adapted to the design of an electrostatic precipitator described by the method described in the present invention.

Figure 4:
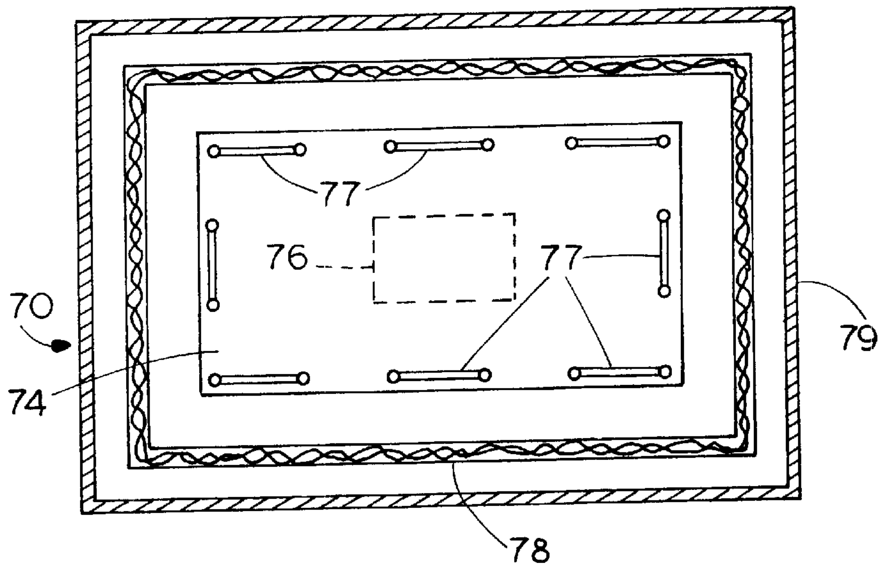
FIG. 4 is a transverse sectional view of a precipitator made according to the present invention but having a rectangular configuration.

FIG. 4 represents a transverse sectional view through a rectangular precipitator. The electrode assembly 72 including a pair of spaced corona wire supports 74 (only one is shown) would be made as before with the two supports 74 spaced along a support rod 76 with wire 77 forming electrodes extending between the supports. The wires 77 are shown in the cross over portions for threading through the holes. A conductive porous medium collecting electrode 78, surrounds the high voltage electrode assembly 72, and the porous medium, and the grounded outer housing 79 have a generally rectangular cross-sectional shape.

In designing such a rectangular precipitator, it is important to keep the individual corona wire lengths between the support 74 at approximately the same distance from the porous collecting electrode 78. This will insure that the corona discharge between the high voltage corona wire 76 and the collecting electrode 78 will be uniform at the same applied voltage on the wires. As before, the lateral distance between the wire lengths and the porous collecting electrode 78 can be reduced to lower the required operating voltage of the precipitator.

Figure 5:
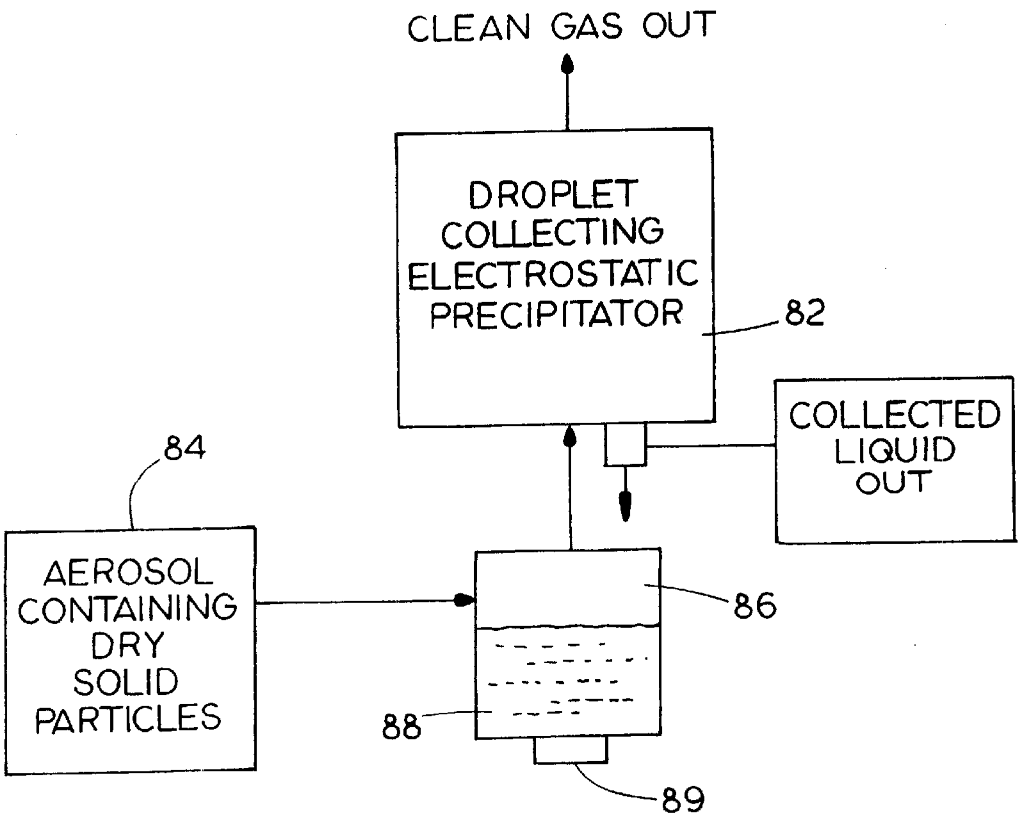
FIG. 5 is a schematic representation of an ultrasonic generator used for introducing aerosols into the electrostatic precipitator in the present invention.

Although the precipitator described in this invention is intended for droplet aerosol collection, it can also be used to collect aerosols containing only dry solid particles. To prevent the build up of solid particles in the porous collecting electrode which will cause plugging of the pores, liquid droplets, usually water, can be added to the aerosol before it is introduced into the precipitator. FIG. 5 shows an ultrasonic droplet generator 80 used in conjunction with an electrostatic precipitator 82 for droplet addition. As aerosol flows from source 84 through the ultrasonic generator 80, it picks up droplets in the space 86 above an agitated liquid 88 produced by ultrasonic agitation using an ultrasonic transducer 89. The dry particulate matter will be precipitated along with the added liquid droplets in the precipitator 82 and be carried away by the liquid stream resulting from the collected droplets, thereby preventing the build up of dry solid material on the collecting electrode in the precipitator. Other droplet generating devices, such as compressed air atomizer, bubblers, and the like can also be used. The electrostatic precipitator can be made as shown in any of the forms disclosed Because of the small droplet size and the large surface area of the droplets produced by ultrasonic agitation or a compressed air atomizer, the combined wet electrostatic precipitator and droplet generator described above will have excellent gas absorptive properties, and can be used as a combined gas and particle scrubber. The combined gas and particle, scrubber will have a variety of applications in air pollution control. For instance, in the semiconductor industry, the exhaust gas from the vacuum pump downstream of a semiconductor process equipment often contains both toxic gases as well as fine particulate matter. One such gas is fluorine, which is used at the end of a process cycle to clean the process chamber. Fluorine is very reactive to water and will be efficiently scrubbed by water droplets in the combined droplet generator and wet electrostatic precipitator. Similarly, various acidic vapors such as hydrogen fluoride (HF) and hydrogen chloride (HCl) can be absorbed by water droplets or by an aqueous solution of KOH and other basic; solutions. By combining a droplet generator with appropriate chemical scrubbing solutions and the wet electrostatic precipitator, a highly efficient combined gas and particle scrubber can be obtained.

Figure 6:
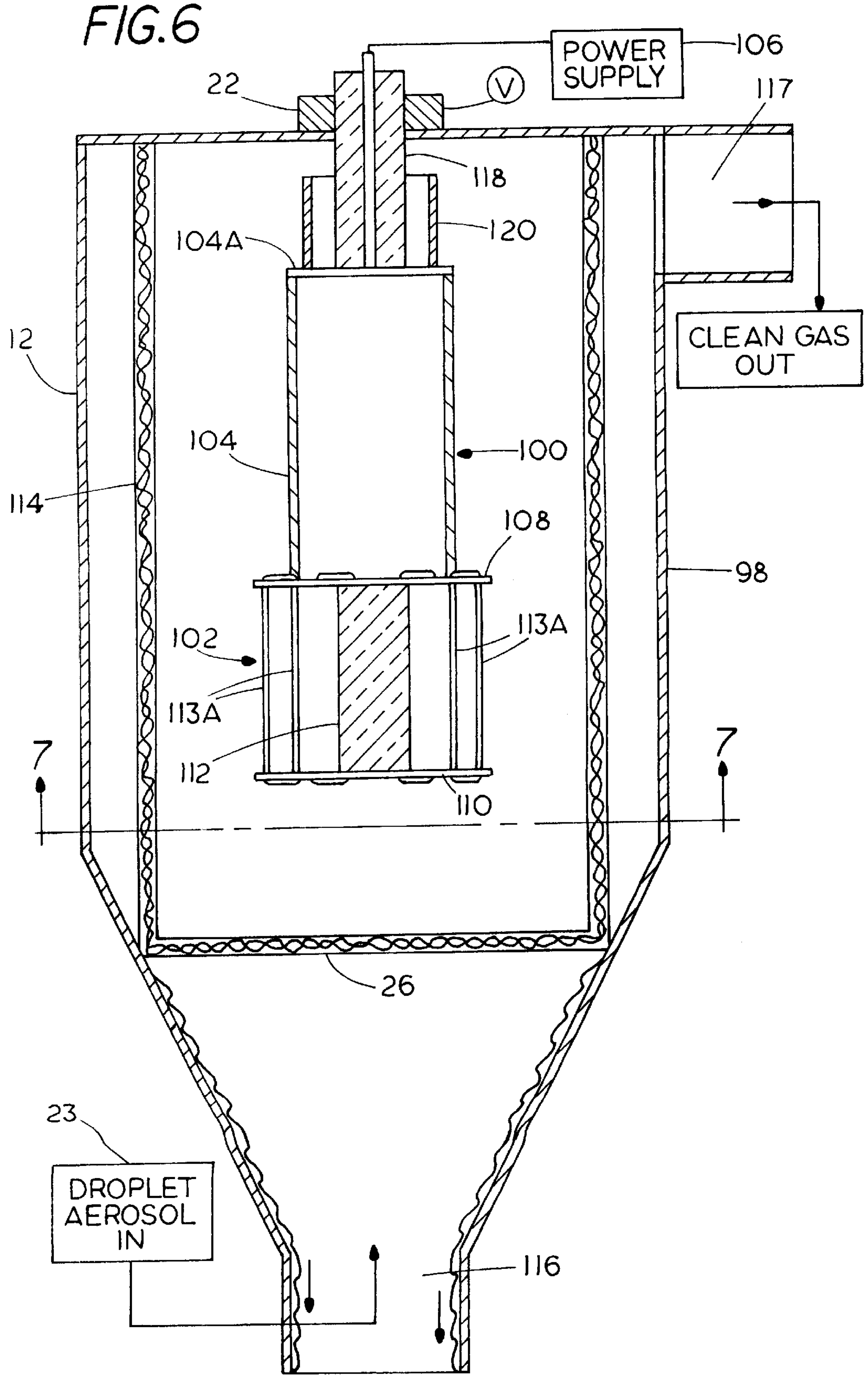
FIG. 6 is a cross sectional view of a modified compact precipitator using a different style of electrode assembly from that shown in FIG. 1.
Figure 7:
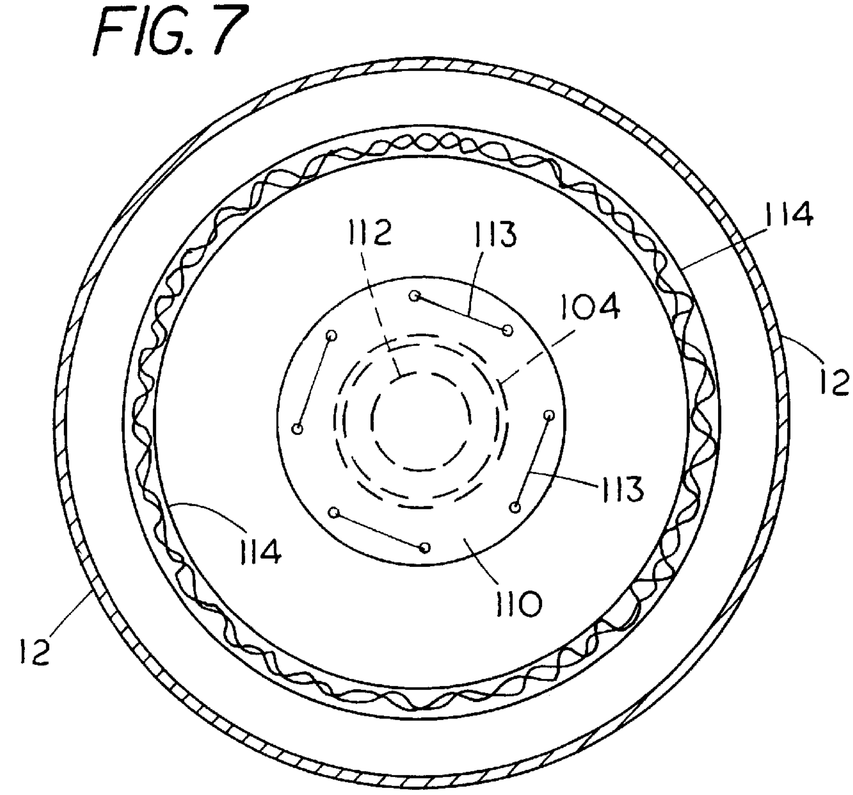
FIG. 7 is sectional view taken on line 7—7 in FIG. 6.

FIGS. 6 and 7 show a compact two-stage electrostatic precipitator 98 in which an electrode assembly 100 including a short corona-discharge electrode 102 that is attached to a cylindrical precipitating electrode 104, and both are held at the same high DC voltage from a voltage or power source 106. The short corona-discharge electrode 102 has a pair of spaced support discs 108 and 110 held together with a central support 112. The discs support a fine wire 113 carrying a high voltage to produce a corona-discharge. The cylindrical electrode 104 is a tubular cylinder with a conducting surface. This cylindrical electrode 104 together with the surrounding porous metal media collector 114 form a precipitating region in which the charged particles are precipitated.

In this two-stage design, the relatively short corona wire lengths 113A forming electrodes produce a corona discharge to charge the droplets or particles moving past the corona-discharge electrode 102. The short length of electrode 102 reduces the corona output from the wires, hence the required current output from the power source 106 is reduced, in turn reducing its physical size, and cost. The design also makes it possible to vary the radius of the circle of the corona wire lengths 113A independently from that of the radius of the tubular cylinder electrode 104. By changing these two radii, both the corona discharge electrode 102, which is an ionizer, and the precipitating cylinder electrode 104 can be independently optimized, leading to improved overall operation of the system.

The discs 108 and 110 are held together with a central support 112. The fine wire 113 is threaded between the discs 108 and 110, and carries the high voltage from the source 106. The high voltage again is carried by wire through an insulator bushing 118, which is surrounded by high voltage carrying shield 120. An end plate 104A on tube 104 carries the voltages to the tube 104. The tube 104 in turn is connected to the disc 108 for powering the corona discharge electrode 102. The flow of gas is from an inlet 116 of housing 12 to an outlet 117, which discharges clean gas.

Figure 9:
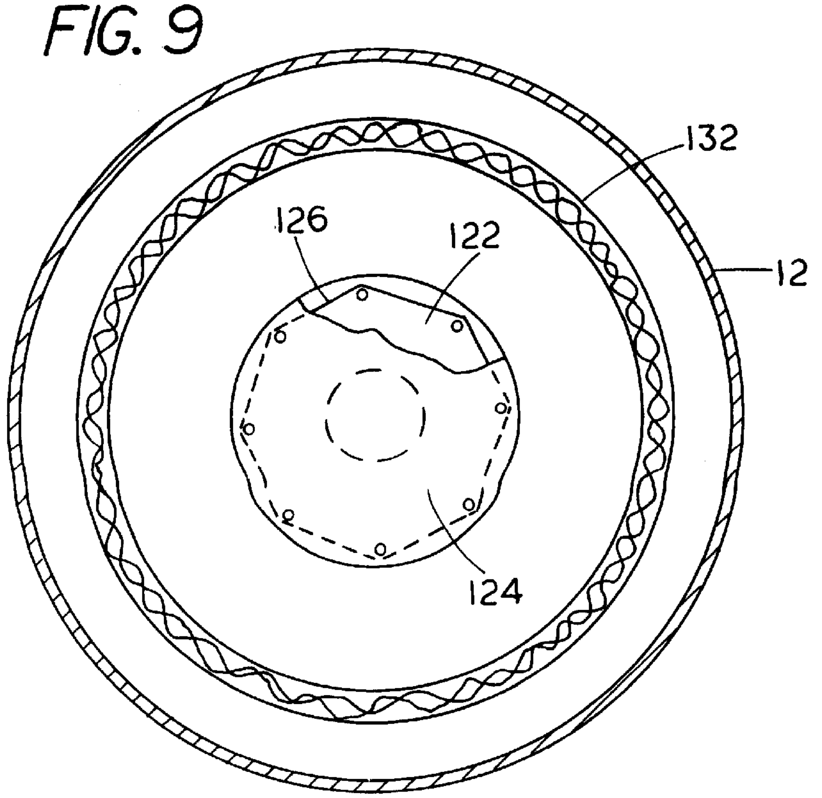
FIG. 9 is a sectional view taken on the line 9—9 in FIG. 8.
Figure 8:
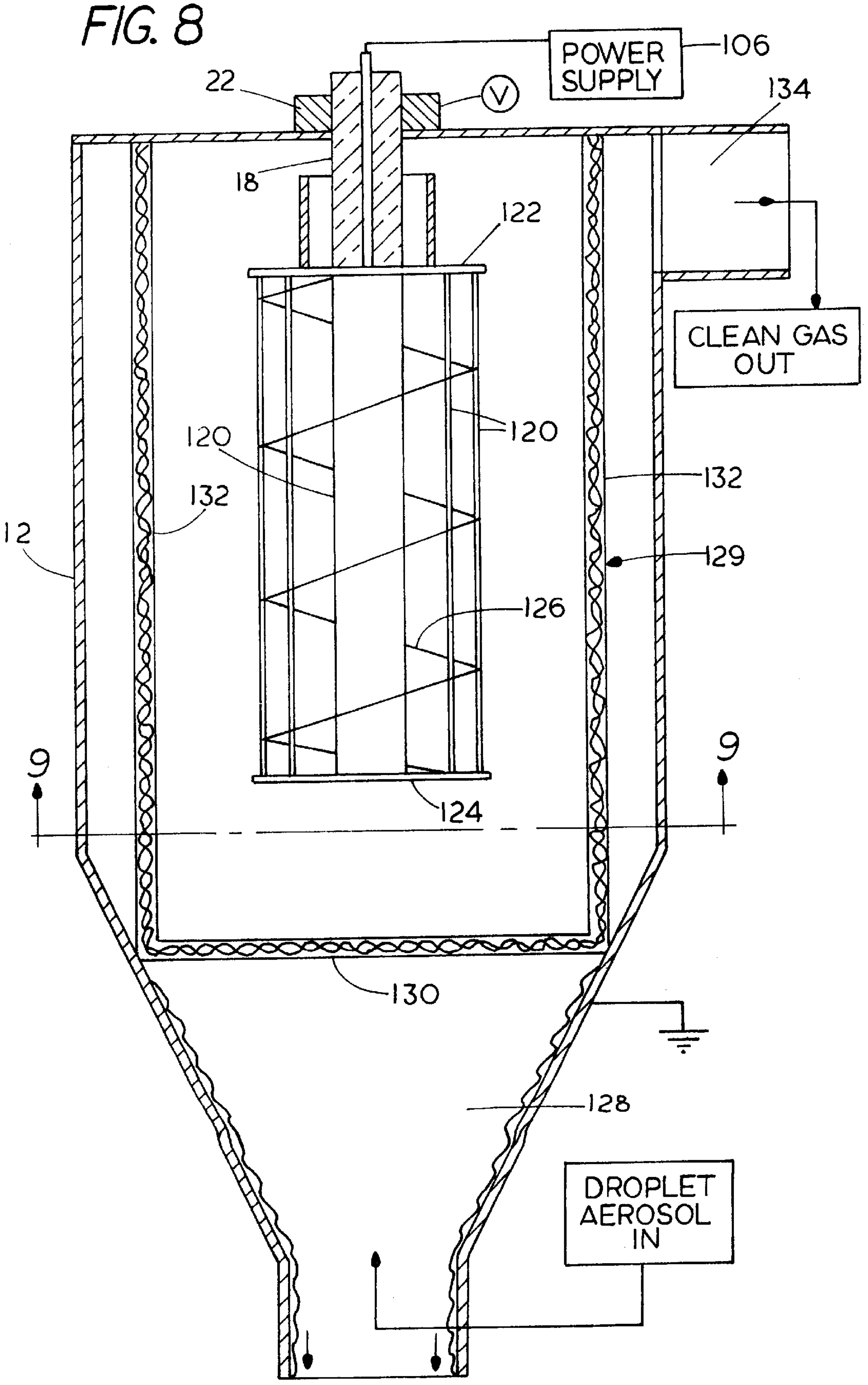
FIG. 8 is a sectional view of a still further modified form of a electrostatic precipitator of the compact electrostatic precipitator of the present invention.

FIGS. 8 and 9 show a modified electrode design that can be used with the single-stage and the two-stage precipitators shown in FIGS. 1 and 6. In this case, a plurality of support rods 120 are attached to the support discs 122 and 124 to form an assembly. A single corona fine wire 126 is spirally wound around the support rods 120 to extend from one disc to the other, and this forms a plurality of segments of conductive wire carrying current for supporting a corona discharge for charging particle in the droplet aerosol introduced through an inlet 128. The porous media collector 129 is shown in FIG. 1 with a coarse filter formed at a bottom panel 130, and selected porosity on a cylindrical electrically conductive porous side wall media 132. The cylindrical side wall 132 acts to precipitate charged droplets and particles as previously shown. The cylindrical wall 132 is grounded, as is the housing 12. An outlet 134 from the housing discharges clean gas. The insulator bushing 18, heater 22 and voltage source are the same as shown before.

Figure 10:
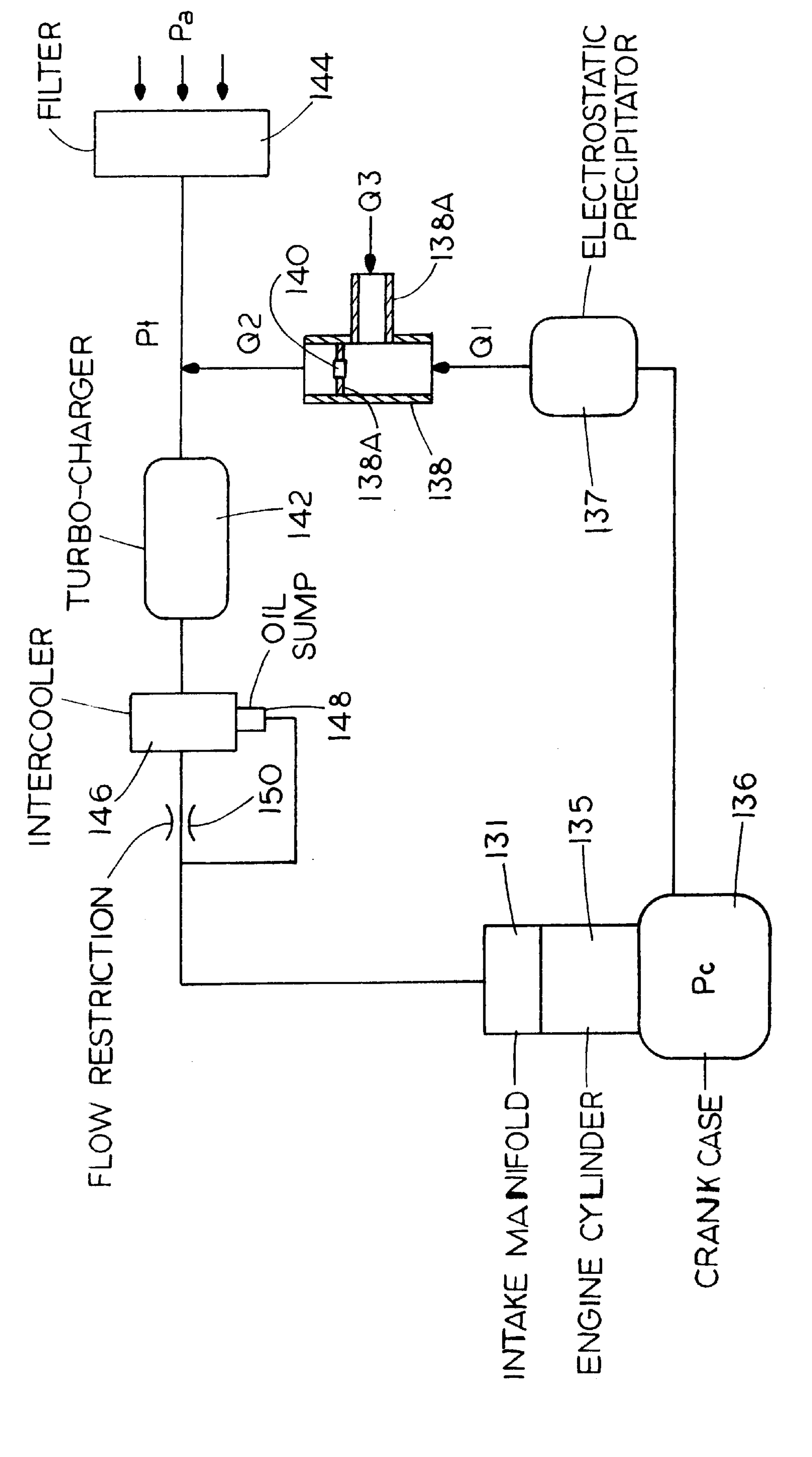
FIG. 10 is a schematic block diagram of a blowby gas recirculation system used in a diesel engine.
Figure 11:
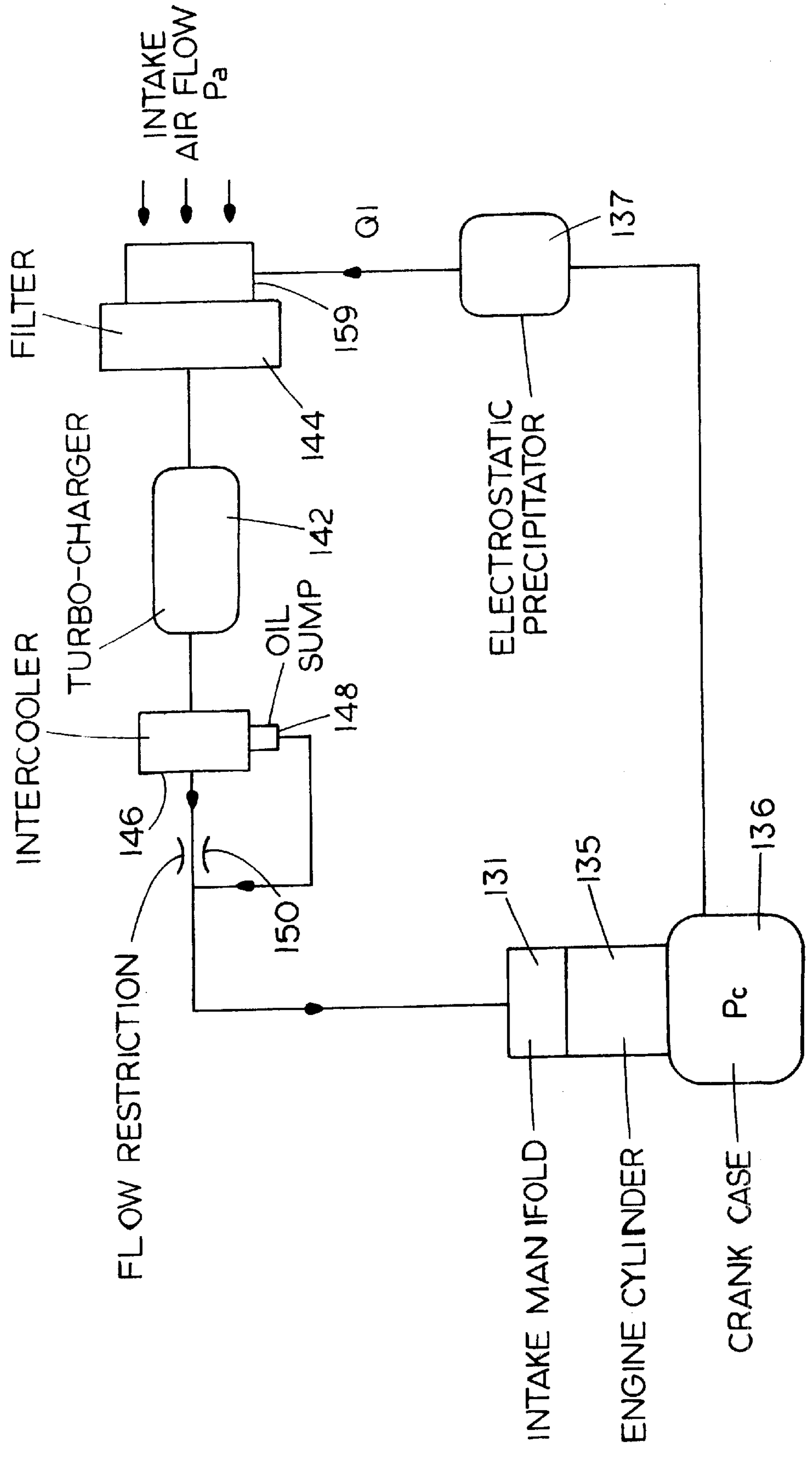
FIG. 11 is a further modified block diagram of a blowby gas recirculation system used in a diesel engine.

The compact electrostatic precipitator described herein can be used to remove suspended particles in the blowby gas from a diesel engine or other internal combustion engines. The blowby gas with the suspended particulate matter removed can be discharged directly into the atmosphere, or can be recirculated into the engine. FIGS. 10 and 11 described below are both suitable for use for any electrostatic precipitator, including that of the conventional design.

FIG. 10 shown one arrangement for blowby gas recirculation using an electrostatic precipitator, preferably one made according to the present invention. The diesel engine 135 has a crankcase 136 and blowby gas from the engine crankcase 136 first flows along a passage through an electrostatic precipitator 137 designed as show previously to remove suspended droplets or particles. The clean gas then flows into the inlet section of a T-connector 138 which has a orifice plate 138A in an outlet section. The gas flows through an orifice 140 in the plate 138A and into the intake of a turbo charger 142. The side inlet section 136D of the T-connector 138 is open to atmosphere.

This T-connector constitutes a crankcase pressure regulating device when an electrostatic precipitator is used to remove particles from the blowby gas for recirculation into the diesel intake. Its operation is as follows. The T-connector 138 inlet 138B is open to the atmosphere, and thus the outlet of the precipitator 137 is also at atmospheric pressure. The crankcase pressure Pc relative to atmospheric pressure Pa is thus $Pc-Pa=\Delta P$, where $\Delta P$ is the pressure drop of the blowby gas through the precipitator 137. This pressure drop is usually quite low, on the order of a few inches of water or less. The crankcase pressure is thus limited to a few inches of water above atmospheric. In an internal combustion engine, the crankcase pressure must not be allowed to vary by more than a few inches above or below atmospheric to prevent leakage of crankcase oil to the outside, and other operational difficulties. This design makes it possible to achieve crankcase pressure regulation with a simple connection and at low cost.

In a diesel engine using a turbo-charger or turbo-compressor to increase the engine power output, as shown in FIG. 10, a filter 144 is used at the air intake of the turbo-charger 142 to remove suspended particles in the ambient air. The pressure drop through 64 the filter 144 causes the pressure Pt at the turbo-charger, intake to be below atmospheric. The diameter of the orifice 140 in the outlet section of the T-connector 138 is chosen such that the pressure drop across the orifice 140 ($\Delta P=Pa-Pt$) is just sufficient to cause the gas flow through the orifice 140 to be the same as the blowby gas flow Q1 during normal engine operation, and when the engine intake air filter 144 is new. When the intake filter 144 becomes partially clogged, its pressure drop increases. This increases the gas flow through the orifice Q2. The difference, $Q3=Q2-Q1$ is made up by the air flow coming from the ambient through the side inlet section 138B of the T-connector 138.

Figure 10A:
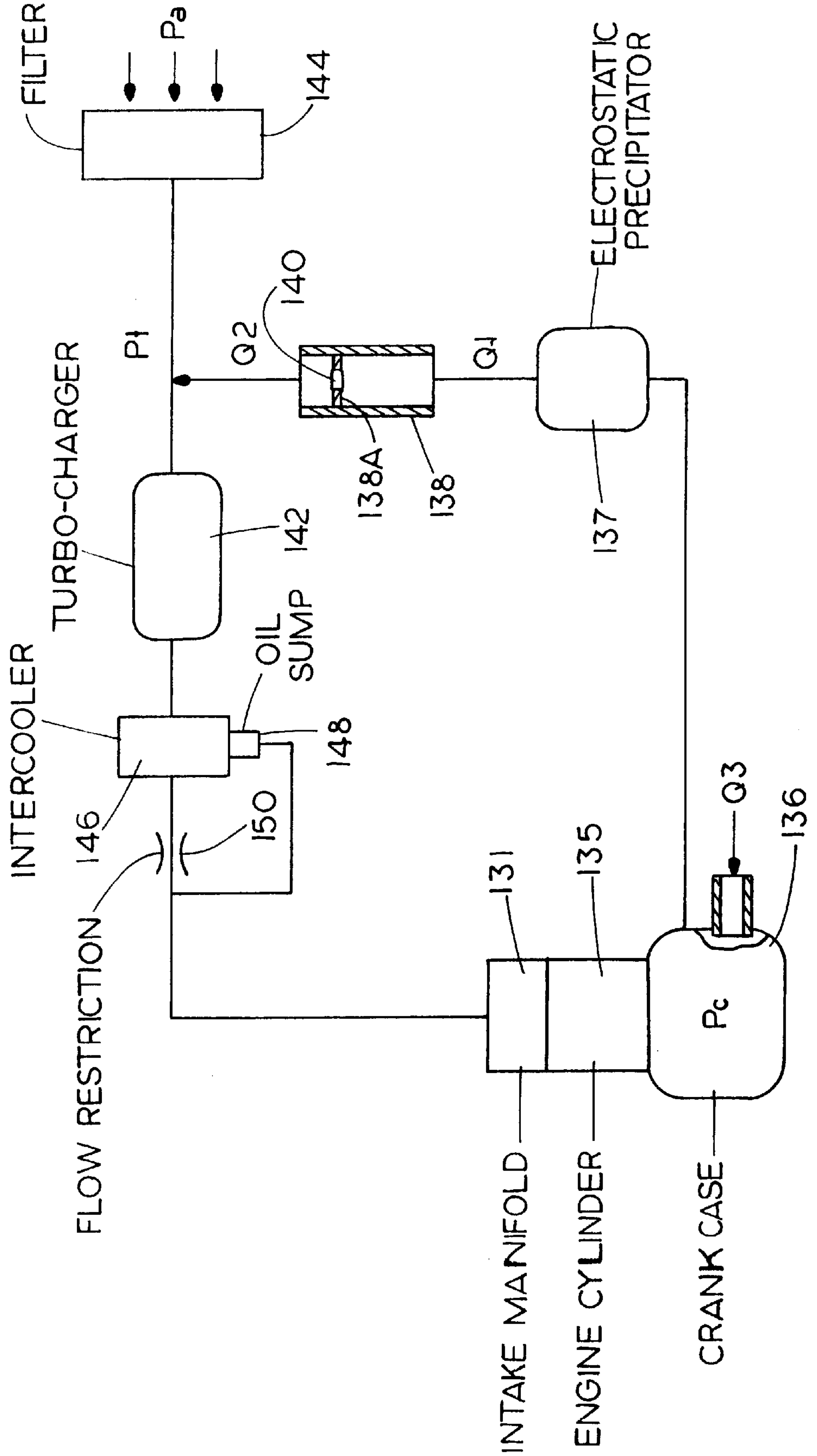
FIG. 10A is a modified recirculation system similar to that shown in FIG. 10.

Alternatively, as shown in FIG. 10A, a modified orifice housing 139 can be made as a straight through flow tube with no side inlet for atmospheric air. An atmospheric inlet 139A can be connected to an opening in the diesel engine crankcase 136.

In both the arrangements shown in FIGS. 10 and 10A, the blowby gas passing through the electrostatic precipitator 137 is at a relatively high temperature. It also contains oil vapor which is not removed by electrostatic precipitation. This oil vapor will condense on the heat transfer surfaces of an intercooler 146 used at the outlet of the turbo-charger 142. Over time, the condensed oil will flood the intercooler 146 to cause a drop in the intercooler efficiency and the power output of the diesel engine if not handled or removed.

To automatically remove this accumulated oil from the intercooler 146, an oil sump 148 is provided in the intercooler to allow the condensed oil to flow into the sump by gravity. The airflow from the intercooler 134 is directed through a flow restriction 150, such as a nozzle or an orifice to create a pressure drop to remove the oil from the intercooler 146 and be carried by the airflow into the engine intake. The oil collected in the oil sump 148 can also be fed to the intake manifold 131 of the engine 135, by the back pressure created by the flow restriction 150.

FIG. 11 shows a second arrangement for recirculating the blowby gas into a diesel engine 135. The crankcase 137 is connected to the electrostatic precipitator 137 as before, but the T-connector 138 is removed and the flow from the precipitator 137 is directed to a filter intake plenum 154 and allowed to pass through the filter 144 along with the intake airflow. No crankcase pressure limiting arrangement is needed in this case. Since the precipitator outlet is always at atmospheric pressure, the crankcase pressure will thus be automatically limited to that needed to maintain the blowby gas flow through the precipitator 137.

When the hot blowby gas is directed this way into the filter intake 154, the oil vapor will be quickly cooled as it comes in contact with the cool collecting filter elements of the filter 144. The vapor will thus condense and be collected in the filter housing. At the same time, all submicron size particles, which may not be completely removed by the electrostatic precipitator, will also be subjected to the strong thermophoretic forces created by the temperature gradient in the boundary layer of the gas flow around the collecting elements of the filter 144, this thermophoretic force can be effectively utilized to remove these submicron particles. Normal engine intake air filters are designed to collect particles larger than a few micron in diameter only. Small particles in the submicron size range are usually not collected. By utilizing the thermophoretic force, the fine particles in the blowby gas can also be collected, thus making the incoming air to the turbo-charger cleaner. With proper design, oil and fine particle accumulation in the intercooler can be reduced to very low level.

Figure 12:
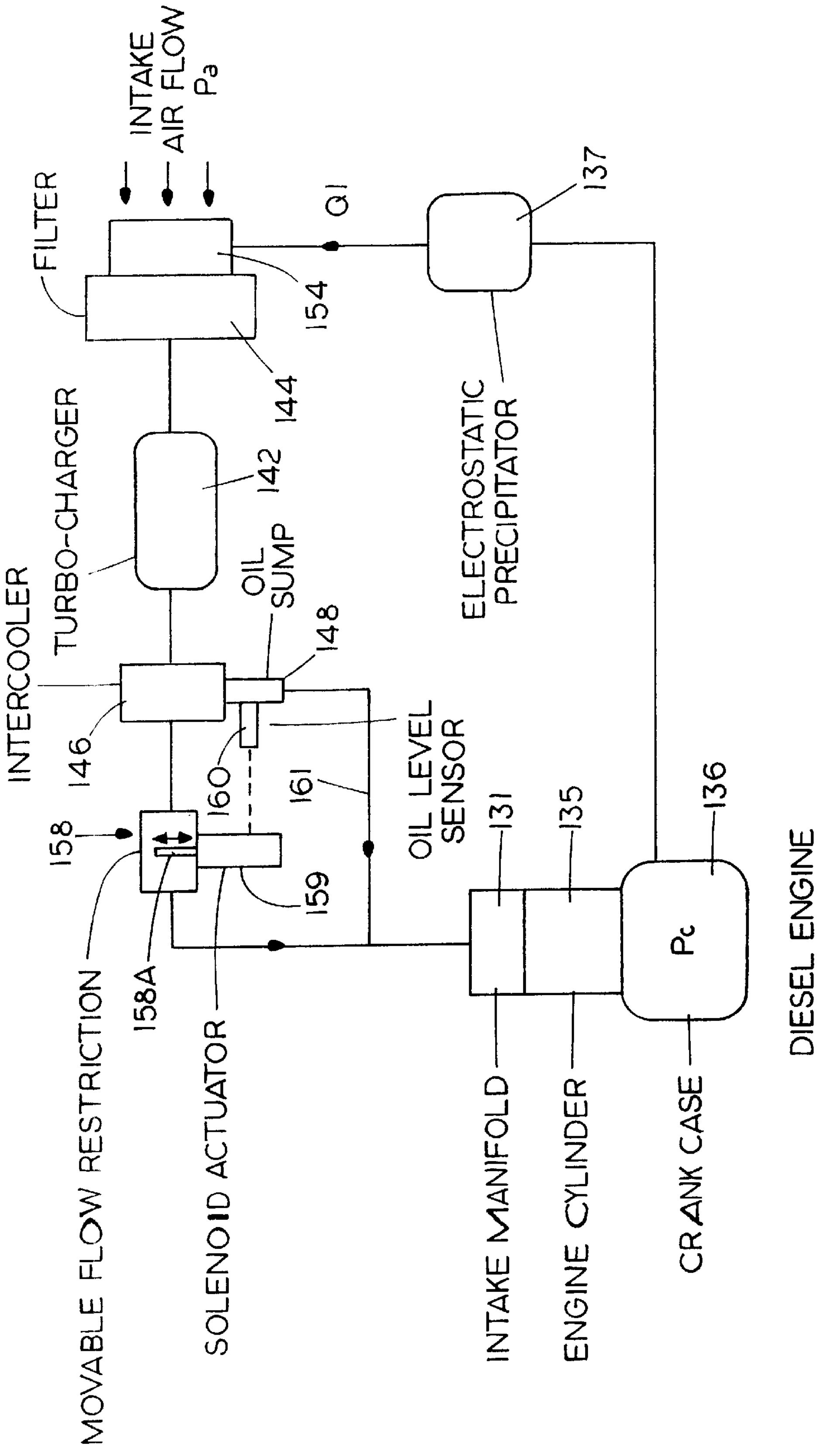
FIG. 12 is a block diagram similar to FIG. 11 with a controlled flow restrictor on the outlet of the intercooler.

FIG. 12 is similar to FIG. 11 and the parts that are identical are identically numbered. In FIG. 12 a controllable flow restrictor 158 is connected to the outlet of the intercooler 146. The flow restrictor has a retractable vane or blade 158A that can be introduced into the interior passage of the restrictor and which is controlled by a solenoid 159. The solenoid 159 is connected to the vane or blade 158A and will extend the blade into the flow passage when a signal is received by the solenoid. An oil level sensor 160 is provided on the oil sump 148, and when the oil level in the sump reaches a set level, the signal is provided to energize the solenoid 159. The vane or blade 758A is moved into the flow passage in flow restrictor 158 to restrict flow through the outlet line.

This action increases the back pressure in the oil sump and forces the collected oil out a line 161 to the intake manifold 131 of the diesel engine. The solenoid controlled restrictor can be any desired form, such a as a valve that closed partially, or an orifice that is introduced into the flow passageway.

Figure 13:
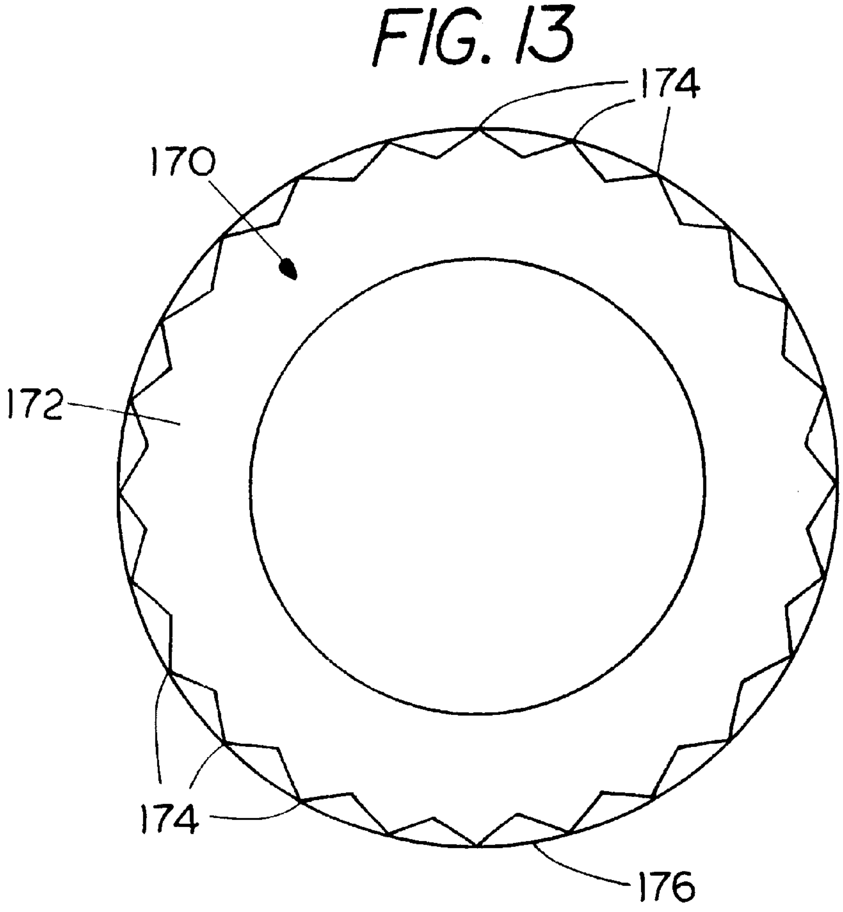
FIG. 13 is a cross sectional view of a modified support for the electrode wire.

FIG. 13 is a sectional view of a modified version of typical electrode support 170. It can be molded from plastic and has an outer wall 172, with a plurality of projections or "prongs" shown at 174 which make the outer surface much like a serrated surface. A wire of suitable diameter indicated at 176 can be wound around the support 170 in a helical fashion, much as shown in FIG. 8, with the points of the serrations or projections supporting the wire 176 at closely spaced intervals depending on the spacing of the serrations to insure that the wire 176 is maintained in a proper position relative to the collector electrode.

Figure 14:
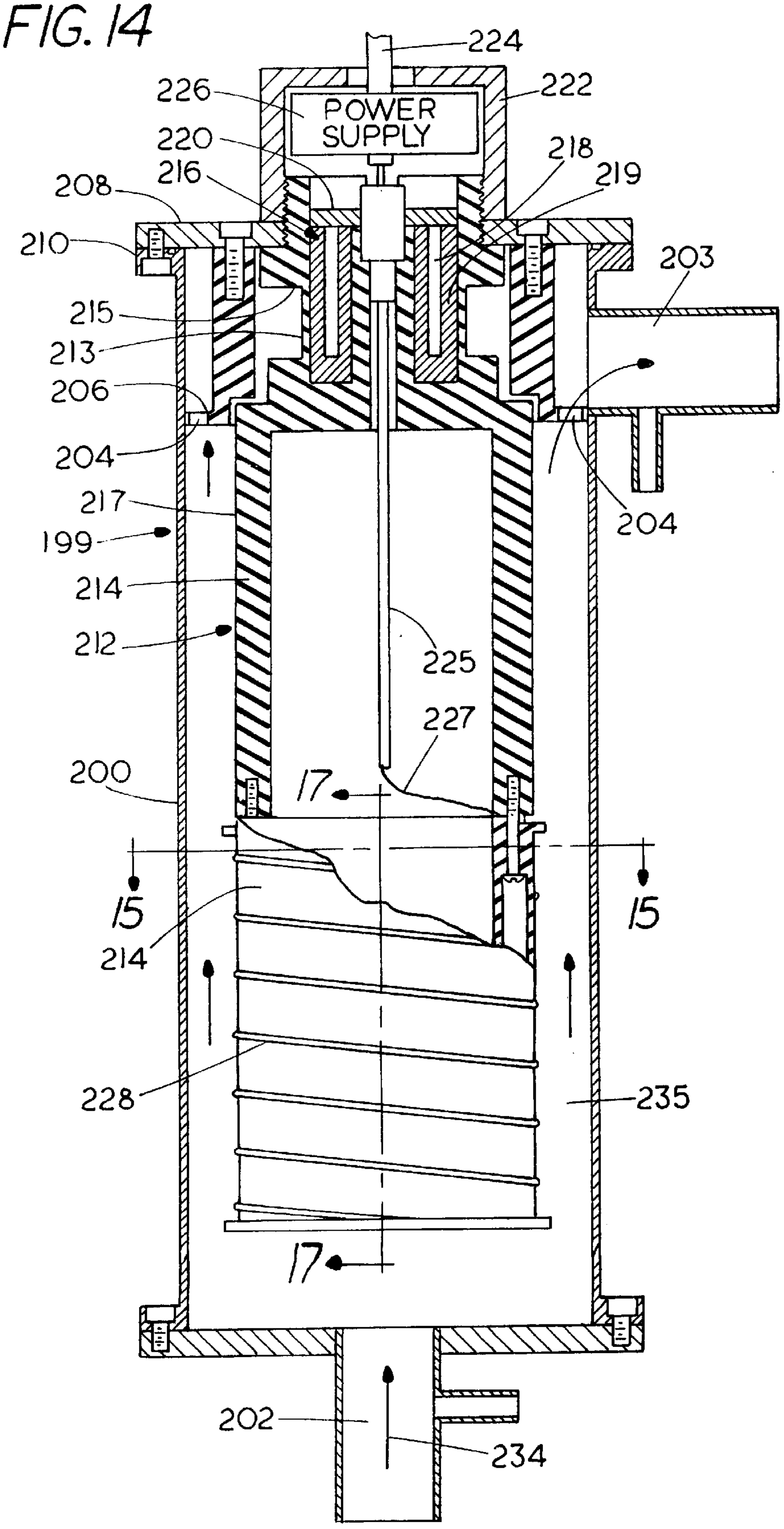
FIG. 14 is a vertical sectional view of a further modified compact electrostatic precipitator.

FIG. 14 is a vertical cross-sectional view of a modified form of a compact electrostatic precipitator 199. In this form of the invention, a conductive sleeve 200 forms a passage for fluid, with an inlet connection 202 for receiving an aerosol, and an outlet connection 203. A flow passageway is defined by a plurality of openings 204 in a housing plate 206 that is supported on sleeve 206A, which is positioned at the upper end of the conductive sleeve 200, and is supported on a cap plate 208 on a flange 210 formed on the end of the outer sleeve 200.

The support sleeve 206A has an open center, and an end insulator portion 215 of a main electrode support 212 is mounted therein. The upper end insulator portion 215 of the support 212 is supported on the cover 208 in a suitable manner. The upper end insulator portion has a receptacle for a heater assembly 216, which has heaters 218 mounted in a outer jacket 219 that is heat conducting and in contact with the insulator portion 215. The outer jacket 219 can be made of copper, which is a very good heat conductor, to distribute the heat uniformly to its outer surface and keep the insulator surface 213 hot and clean from contamination by vapor condensation and particle deposition. The top plate 220 is a heat insulator to reduce the heating power required to operate the heater. The electrical power to operate the heater, usually 12 or 24 volts, is carried by the electrical leads 221 passing through the top plate 220.

A power connection line 224 can be passed out through a central opening of a cap 222. As shown, a power supply 226 to provide the high voltage for the discharge electrode can be potted in the cap 222 and the connector line or rod 225 can be within the precipitator and does not have to extend through the cap. The line 224 can be a relatively low voltage, for example, a 24-volt supply could be provided. The heaters 218 also would be connected generally to a 24-volt supply.

Figure 15:
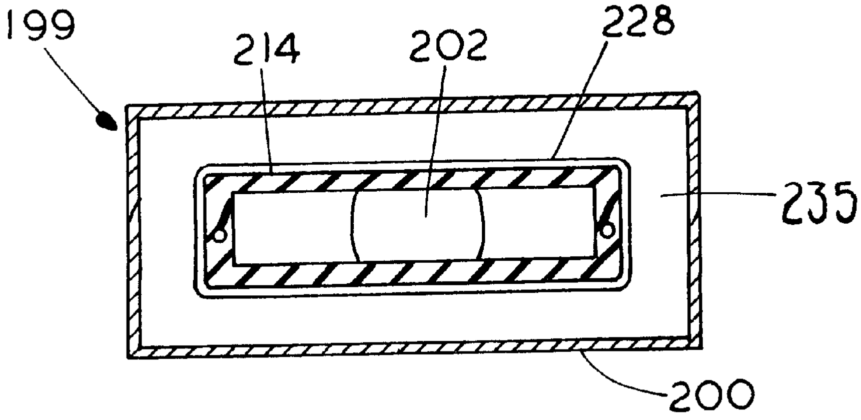
FIG. 15 is a sectional view taken on line 15—15 in FIG. 14.

The main support 212 includes a hollow center electrode support 214 that can be, for example, injection molded as a single piece with the main support 212. The electrode support 214 has an interior passageway in which the high voltage connection rod or line electrode 225 extends, and a thin electrode wire 227 can extend for connection directly to the electrode wire shown at 228 that, as shown, is helically wrapped around the insulating support 214. The electrode wire 228 is shown larger than actual size and is a thin wire as previously explained. The insulating material sleeve 214 may be attached to the main support 212 with suitable screws threaded up into the support 212. The upper part of the insulating support has a conducting sleeve 217, which can be made of a metal and connected to the same high voltage electrode wire 226. The insulating support 214 can have a cross section that is cylindrical, if desired, or as shown in FIG. 15, it could be rectangular with the outer collector electrode 200 also being rectangular with care being taken so that at the corners there was a uniform spacing between the wire 228 and the collector electrode.

The cross section can take any desired configuration, as long as the spacings are maintained for a corona discharge.

The aerosol flow would come in as shown by the arrow 234, and flow up and around the passageway 235 between the high-voltage electrode wire 228 and the collector electrode 200. In this case, the collector electrode. 200 is not a porous member, but is a solid member that can either be stainless steel, for example, or could be a conducting plastic. As the flow passes through the space between the electrode wire 228 and the collector 200, the particles are charged by the corona ions produced by the wire electrode 228. Some of these particles are precipitated onto the collector 200 in this region. The remaining particles are carried by the gas to the upper part of the assembly between the precipitator electrode 217 and the collector electrode 220, where they are precipitated onto the collector 220 by virtual of the high voltage on the electrode 217. The flow then goes up through the openings 204, and out through the outlet 203 as shown. The main support 212 and the electrode support 214 can be injection molded as a single piece, if desired, with conductors formed as slip-fit jackets, or wrapped wires. The heaters 218 are easily installed to ,maintain the temperature of the insulator at a desired level.

The high temperature at the heaters keeps vapor that enters the space between the sleeve 206A and the upper high voltage insulator portion 215 from condensing on the surface 213 of the high voltage insulator portion 215 in the region around the center portion 215. The heaters also provide enough heat to tend to repel contaminant particles by the thermophoretic effect and prevent them from depositing on the surface 213 of the high voltage insulator portion 215. The heaters 218 are in heat transfer, contacting relation to the insulator portion 215 and will maintain the temperature of the surface 213 sufficiently high to prevent contaminant particles from building up on the surface of the insulator portion. Preferably the temperature of the surface 213 of the insulator portion 215 is 10° or more than the temperature of the gas in the vicinity of the insulating surface 213 inside the precipitator housing.

Figure 16:
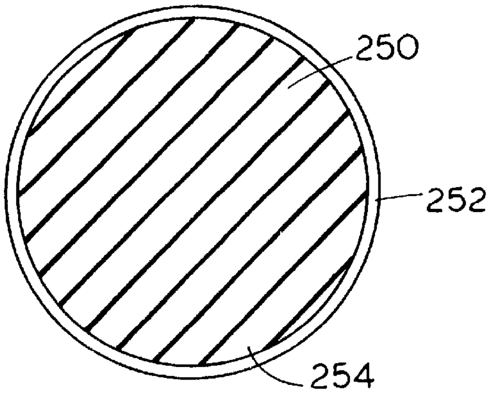
FIG. 16 is a cross sectional view of a modified support for the electrode wire as it would be taken along the line 15—15 of FIG. 14.
Figure 17:
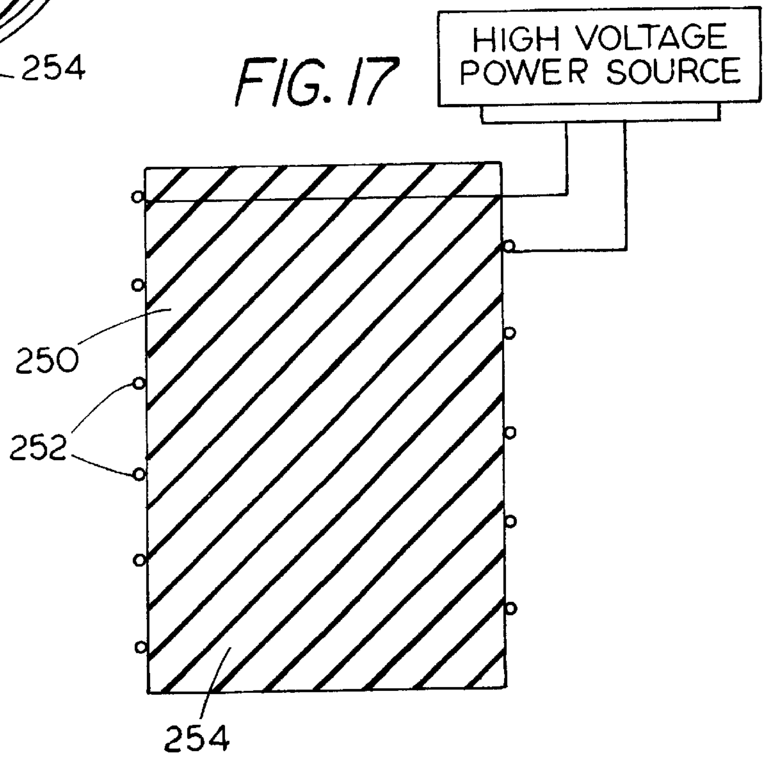
FIG. 17 is a cross sectional view of a modified support for the electrode wire as would be taken along the line 17—17 of FIG. 14.

FIG. 16 is a transverse cross sectional view of a modified electrode support 250 taken on the same line as FIG. 15. FIG. 17 is a vertical cross sectional view of the modified electrode support 250. A wire 252 forming the electrode is in contact with the surface 254 of the electrode support 250 and in substantial conformity to it. The wire 252 can be wound around the support 250 as shown, and made to adhere to the surface 254 by using a suitable adhesive material. When adhesives are used the wire 252 can have various patterns.

Figure 18:
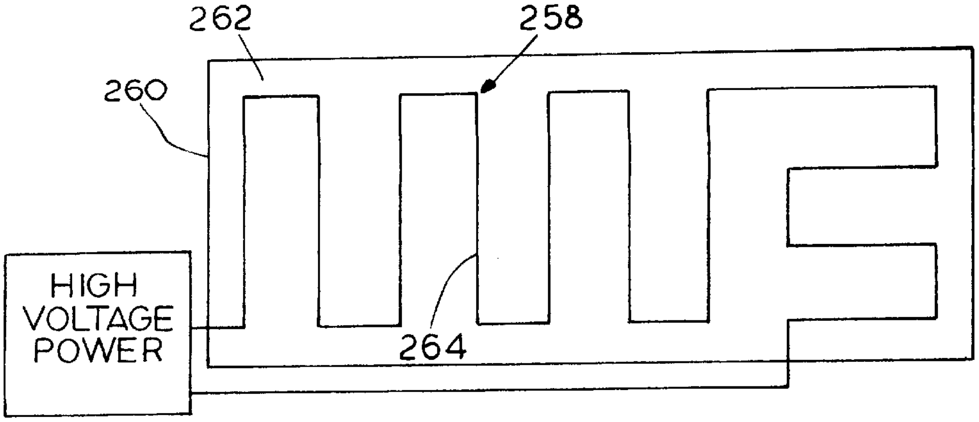
FIG. 18 is a flat layout of a cylindrical electrode support unrolled to a flat surface to reveal a modified pattern for the electrode wire supported on the electrode surface.

One such pattern for the wire 252 is shown in FIG. 18 at 258. In FIG. 18 a surface 262 of a support 260 has been unrolled to a flat surface to review the wire pattern on the surface 262. The electrically conductive discharge wire 264 is in contact with the support surface 262, which is made of an electrically insulating material, such as a plastic or ceramic. The wire electrode 264 is of a substantially uniform diameter and the distance between the wire segments and the adjacent collector electrode is substantially uniform along the length of the wire. With a uniform distance between the wire 264 and the collector electrode, a substantially uniform corona discharge can be maintained. All parts of the wire 267 can thus be utilized effectively to insure a high charging efficiency in a small compact overall physical size for the electrostatic droplet collector.

Another way of fabricating the thin wire discharge electrode is to use a flat, thin dielectric, generally plastic, having a thin film clad on the outer surface. The flat thin dielectric with a thin film on the outer surface can be similar to those used in fabricating flexible, electric circuit boards. The electrode wire pattern on the surface can be etched by photolithography. The thin film forming the pattern can then be applied to the surface of the support structure by an adhesive. In such a case, the wire will no longer have a circular cross section. The lateral dimension of the etched electrode, however, must be sufficiently small to sustain a corona discharge at the applied high voltage material.

The compact electrostatic precipitators shown are intended primarily for droplet aerosol collection. The high collection efficiency for the compact size also make the precipitators suitable for collecting dry particle aerosols. The collected dry particles will accumulate in the unit and the precipitators must be periodically shut down for cleaning and maintenance. This is usually acceptable for most applications.

The compact electrostatic precipitator described herein, though not necessary for the application, is particularly attractive because of its compact physical size and high collection efficiency.

The invention as described above is for the preferred embodiments. Others, who are skilled in the art, will see other possibilities and embodiments to accomplish the same objectives based on the principles and approaches described in the present specifications.

What is claimed is:

1. An automatic condensed oil remover for an intercooler of a diesel engine comprising a flow restrictor between the intercooler and the diesel engine, an oil sump in the intercooler, and an oil tube to carry condensed oil from the oil sump to the diesel engine, said flow restrictor comprising means for creating a pressure drop sufficient to force the oil to flow from the oil sump through the oil tube to the diesel engine.

2. The condensed oil remover of claim 1, wherein the flow restrictor a is selectively operated to create pressure drop sufficient to force the oils to flow from the oil sump through the oil tube to the diesel engine, and a control to selectively operate the flow restrictor.

3. An automatic condensed oil removal system comprising the condensed oil system of claim 1, and an oil level sensor to provide the signal to actuate the flow restrictor and create a pressure drop sufficient to force the oil to flow from the oil sump through the oil tube to the diesel engine.

* * * * *

UNITED STATES PATENT AND TRADEMARK OFFICE

CERTIFICATE OF CORRECTION

PATENT NO. : 6,527,821 B2
DATED : March 4, 2003
INVENTOR(S) : Liu et al.

It is certified that error appears in the above-identified patent and that said Letters Patent is hereby corrected as shown below:

Column 16,
Line 38, after "restrictor" delete "a".
Line 39, change "oils" to -- oil --.

Signed and Sealed this

Sixteenth Day of December, 2003

JAMES E. ROGAN
*Director of the United States Patent and Trademark Office*